(12) United States Patent
Cloward

(10) Patent No.: US 6,539,601 B1
(45) Date of Patent: Apr. 1, 2003

(54) BEARING PRESS

(76) Inventor: Floyd E. Cloward, P.O. Box 3130, Sequim, WA (US) 98382

( * ) Notice: Subject to any disclaimer, the term of this patent is extended or adjusted under 35 U.S.C. 154(b) by 0 days.

(21) Appl. No.: 10/164,401

(22) Filed: Jun. 10, 2002

(51) Int. Cl.[7] .............................................. B23P 19/04
(52) U.S. Cl. ....................................................... 29/263
(58) Field of Search ........................... 29/256, 263, 266

(56) References Cited

U.S. PATENT DOCUMENTS

| | | |
|---|---|---|
| 2,234,824 A | 3/1941 | Kingston |
| 3,403,434 A | 10/1968 | Calabro |
| 3,571,886 A | 3/1971 | Corsmeier |
| 3,594,890 A | 7/1971 | Cordell et al. |
| 3,742,570 A | 7/1973 | Felser, Jr. |
| 3,777,354 A * | 12/1973 | Masters ........................ 29/256 |
| 4,209,888 A | 7/1980 | Glasscock, Sr. |
| 4,509,241 A * | 4/1985 | Freeland et al. .............. 29/263 |
| 4,564,988 A | 1/1986 | Norrod |
| 4,682,395 A | 7/1987 | Klann |
| 4,809,420 A | 3/1989 | Landy et al. |
| 5,177,848 A | 1/1993 | Halstead |
| D355,823 S | 2/1995 | Dumas et al. |
| 6,266,861 B1 | 7/2001 | Chen |

* cited by examiner

*Primary Examiner*—Robert C. Watson
(74) *Attorney, Agent, or Firm*—Richard C. Litman

(57) ABSTRACT

A bearing press for removing or installing bearings or bushings. The press is an assembly of plates with apertures to enable a user to apply pressure upon a propeller strut with bearing for a propeller shaft in order to remove and replace or reinsert the bearing. The press is assembled about the shaft and does not require removal of the propeller shaft from the strut or the boat to remove a bearing. A user tightens bolts on both sides of the shaft which forces the old bearing out of the strut and into half cylinders which are spacers to allow the old bearing to be removed. The new bearing may be replaced at the same time the old is removed or another smaller pair of half cylinders may be used to only remove the bearing for examination.

14 Claims, 3 Drawing Sheets

BEARING PRESS

BACKGROUND OF THE INVENTION

1. Field of the Invention

The present invention relates generally to press assemblies for the removal and replacement of bearings, and more specifically to a press for use upon a propeller shaft in the external strut for boats to remove and replace or examine the strut bearing, but has many other uses in any field where there is a need to extract and replace or examine a bearing or bushing.

2. Description of the Related Art

Replacement or examination of propeller shaft bearings in particular usually involves the use of a hammer and punch to knock out the bearing from its position, a potentially damaging, dangerous and unpleasant chore. There is a need for a press tool or assembly for safely and easily removing shaft bearings or bushings for replacement or examination.

U.S. Pat. No. Des. 355,823 to Dumas et al. discloses a design for a combined hub puller and joint pusher but cannot be placed around an intervening structure.

U.S. Pat. No. 2,234,824 to Kingston for a Bushing Puller discloses a bearing puller that is unable to apply pressure one reversed sides of an intervening structure.

U.S. Pat. No. 3,403,434 to Calabro for a Bearing Race Extractor discloses an assembly that requires manipulation of an assembly that is not available to all maintenance personnel for boats.

U.S. Pat. No. 3,571,886 to Corsmeier for an Attachment Device and Cooperating Tool Means discloses a tool for removably securing shaft components but fails to provide for bearing removal.

U.S. Pat. No. 3,594,890 to Cordell for an Explosive Actuated Pulling Apparatus discloses an assembly which can extract a bearing from around a shaft or from within an aperture but not simultaneously.

U.S. Pat. No. 3,742,570 to Felser, Jr. for a Bearing Removal Structure discloses a tool assembly which can remove a bearing from within an aperture and around a shaft but must have access to the end of the shaft and may cause warping and jamming of the bearing.

U.S. Pat. No. 4,209,888 to Glasscock, Sr. for a Shaft Puller discloses a shaft puller which will remove a shaft from a bearing seat if the shaft has a threaded end.

U.S. Pat. No. 4,564,988 to Norrod for an Apparatus for Fitting a Boot to a Universal Joint discloses a tool assembly which may be used to press fit a face of a flexible boot on a constant velocity joint.

U.S. Pat. No. 4,682,395 to Klann for a Device for Pushing Wheel Flange Hubs and Splined Flange Hubs of Motor Vehicles Out of a Shaft Bearing discloses a mechanism to pull a wheel flange hub or splined hub from a press-fitted mount but cannot be used for bearings mounted about a shaft.

U.S. Pat. No. 4,809,420 to Landy et al. for a Method and Apparatus for Backing Up Mandrel Exit Holes in Knuckle Structures discloses an assembly for deforming bushings into seats in an aperture but does not aid in bearing removal.

U.S. Pat. No. 5,177,848 to Halstead for a Hand Tool for Generating Simultaneous Pushing and Pulling Forces discloses a hand tool for generating a shear force between attached elements but requires access from the end of a shaft and all around the member to be pulled from it.

U.S. Pat. No. 6,266,861 B1 to Chen for a Device for Mounting Bearings Onto a Shaft discloses mounting of bearings onto a shaft go but requires a shaft with a threaded aperture at the end and access to the end of the shaft and fails to mention removal or installation of a bearing from an aperture.

None of the above inventions and patents, taken either singularly or in combination, is seen to describe the instant invention as claimed. Thus a bearing press solving the aforementioned problems is desired.

SUMMARY OF THE INVENTION

The invention is a bearing press for removing or installing bearings or bushings, and includes an assembly of plates with apertures to enable a user to apply pressure upon a propeller strut with bearing for a propeller shaft in order to remove an old bearing, and then insert a new bearing. The press is assembled about the shaft and does not require removal of the propeller shaft from the strut or the boat. A user tightens bolts on both sides of the shaft which forces the old bearing out of the strut and into half cylinders which stabilize the assembly and also function as spacers to allow the old bearing to be removed. The new bearing may be replaced at the same time the old is removed or another smaller pair of half cylinders may be used to only remove the bearing for examination.

Accordingly, it is a principal object of the invention to provide for the easy and quick removal of a shaft bearing from a stationary mounting.

It is another object of the invention to enable removal and replacement of cutless bearings or bushings for small boats.

It is a further object of the invention to reduce damage to propeller struts and boat hulls, which are weakened by the standard removal procedure which entails use of hammer and punch.

Another object of this invention is to enable the repair and replacement of shaft bearings without dismantling or removal of the shaft and attached members, or the propeller.

Still another object of the invention is to provide an improved bearing puller of low cost and high durability.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

This invention may be used to remove or install or remove and install bearings or bushings in any location that is available to a user with the room to enable the assembly of the rear plate and manipulation of the press main bolt nuts. Though originally intended to ease the removal of the cutless bearing from a propeller strut on a boat, the invention may be used in countless other locations, for many other implements.

Wear is frequently noticed in propeller shaft, cutless, bearings of boats, especially if the propeller is mounted too far from the strut or if the motor is not mounted exactly in line with the shaft. The removal and replacement of the bearing or bushing usually requires removal of the propeller shaft from the engine and strut, as well as removal of the propeller. Normally, the removal of the bearing requires hammering the bearing out with a punch, which also tends to place undue stresses upon the strut itself, and also frequently results in damaging the hull.

The bearing press does just that; it presses the bearing out of the strut with little if any impact upon the remainder of the hull, and without requiring the removal of the propeller shaft.

In the conventional boat hull, propeller strut 2 has bearing or bushing 1 which receives propeller shaft 3. When this bearing is bad and needs replacement or at least examination, it has previously required the removal of the propeller shaft 3 and rudder (not shown) that may be behind the propeller. By use of the present presser invention, bearing 1 may now be removed and reinserted, or removed and replaced with little impact upon the propeller strut, and without requiring the removal of the shaft.

Figure 1:
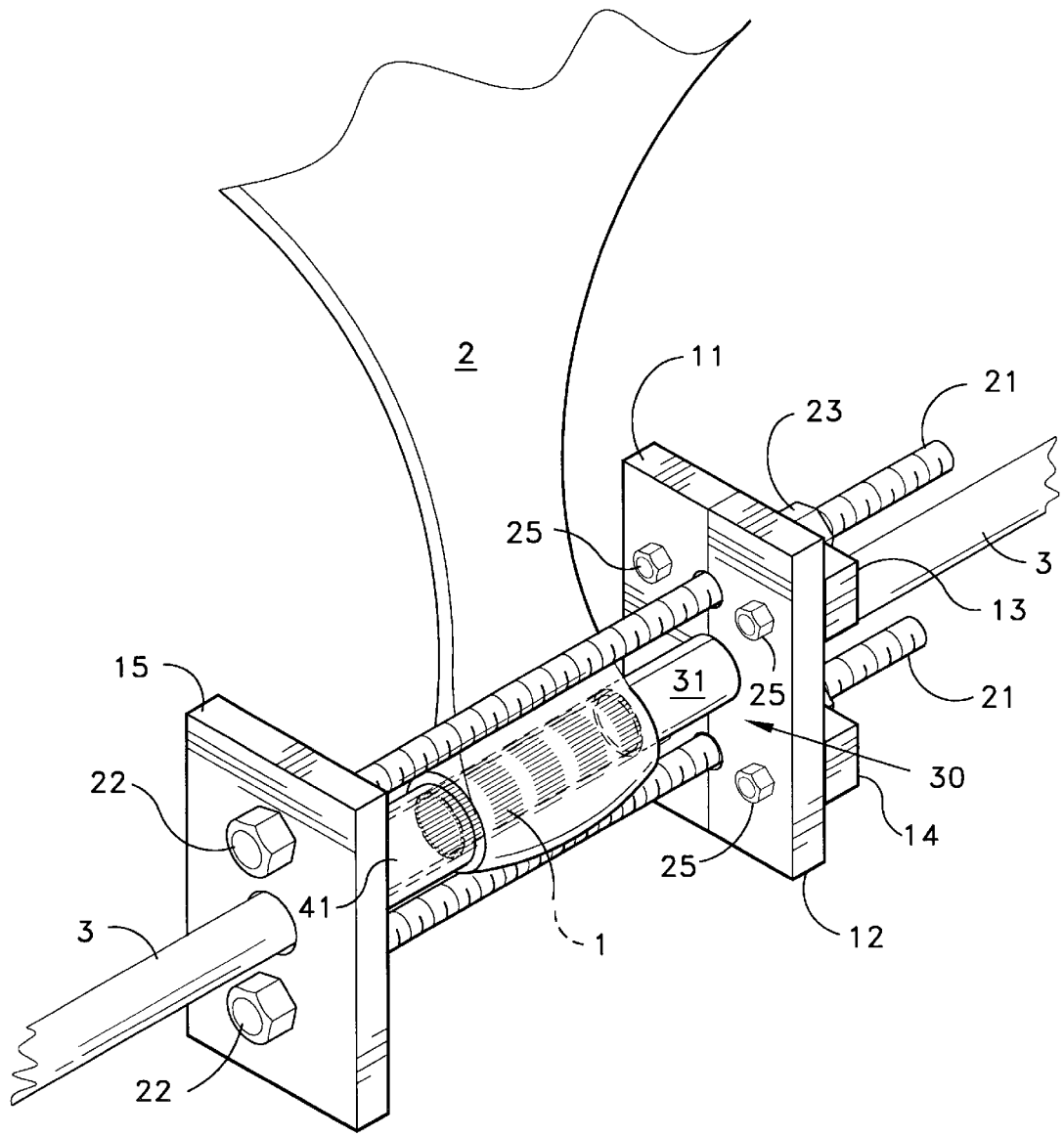
FIG. 1 is a perspective view of a bearing press according to the present invention in place upon a propeller shaft and propeller strut.
Figure 2:
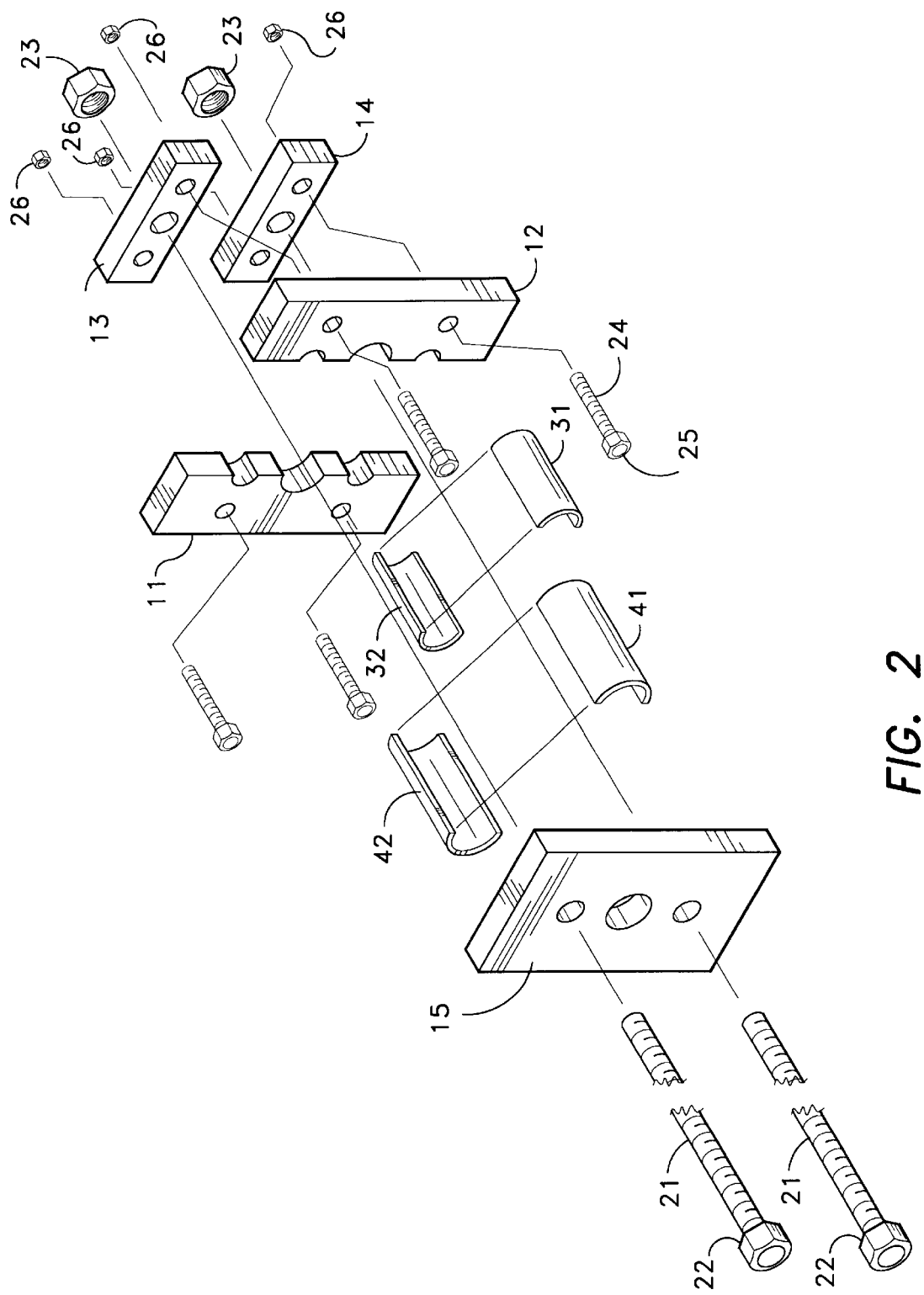
FIG. 2 is a exploded, perspective view of the invention as shown in FIG. 1.
Figure 3A:
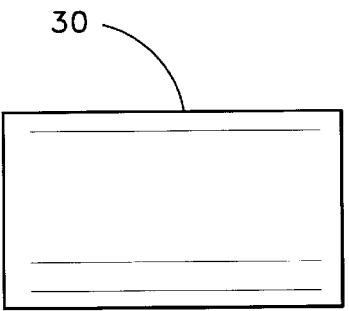
FIGS. 3A and 3B are front elevational and exploded end views, respectively, of the bearing presser portion of the invention.
Figure 3B:
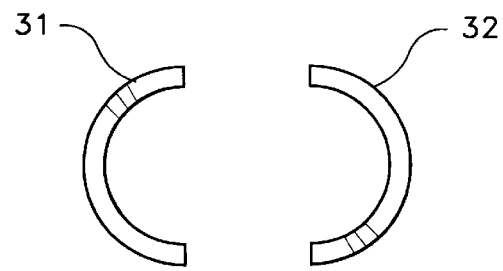
Figure 4A:
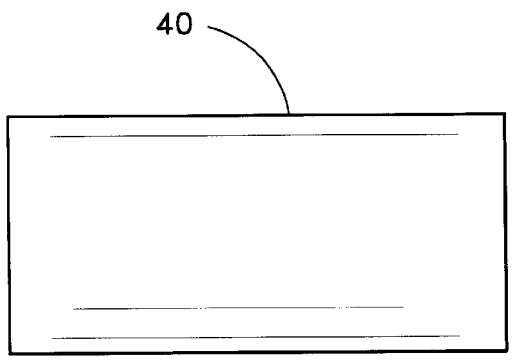
FIGS. 4A and 4B are front elevational and exploded end views, respectively, of the bearing receiver portion of the invention.
Figure 4B:
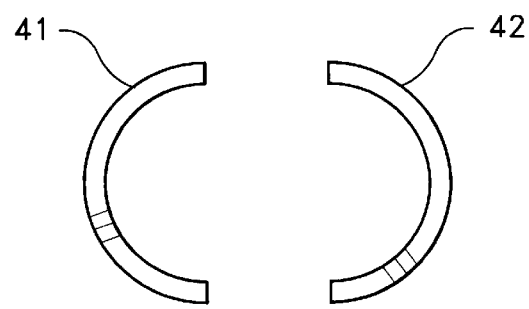

The rear plate is first assembled by using rear plate halves 11 and 12 attached to rear plate ties 13 and 14 using four rear plate assembly bolts 25. The longer press main bolts 21 are next in place and attach front plate 15 to the assembly. Bearing receiver 40, comprising halves 41 and 42 (see FIGS. 4A, 4B), is placed around the propeller shaft adjacent to the front plate 15. Bearing pusher 30, comprised of halves 31 and 32, is placed between the bearing and the rear plate assembly. It should be noted that the outside diameter of the bearing presser is smaller than the inside diameter of the propeller strut, the seat for the bearing. The bearing pusher 30 is not as thick as the bearing and does not completely surround the shaft to allow removal from the strut after pushing the bearing 1 from its seat between the shaft 3 and strut 2.

During use, the rear plate (11, 12) pushes the bearing presser 30 in onto the bearing by tightening of the main bolt nuts 22. The front plate 15 engages bearing receiver 40 which is braced against the sternmost portion of the propeller strut 2 but, as the bearing receiver 40 is larger than the shaft, allows the bearing 1 to be pushed under the receiver 40.

It is not unusual for the bearing to be made of hardened rubber and split for assembly into the strut around the shaft. After the damaged bearing is removed from the strut, it may be removed from the shaft by whatever means necessary, to include total destruction of the bearing.

As propeller struts may have bearings that are longer that the bearing presser 30 in some installations, it is considered that several bearing pressers may be used together to force the bearing far enough to be removed from the strut.

In the case where a strut is in close proximity to a shaft joint, shortened bearing pressers may be used, and several can be employed if needed.

When used to install a bearing, the bearing receiver 40 need not be used, unless the old bearing is being removed simultaneously. When installing a bearing, either the front plate or the rear plate assembly may be used directly to drive the new bearing into the strut, and the bearing receiver is not needed to space the front plate. When replacing a bearing at the same time the old bearing is being removed, the bearing receiver will be needed to brace the front plate from the strut and to allow the worn bearing to exit from the strut.

In the case when a bearing is not split or bifurcated, the propeller will need to be removed so that the bearing may be forced over the end of the propeller shaft. Once placed adjacent the strut, the bearing press can then be used to force the bearing into the strut around the shaft.

The present invention has been described in the environment of boats and for use with a cutless bearing for the propeller shaft at the propeller strut. This same assembly may be used for any bearing where space is available for assembly of the rear plate assembly and manipulation of the press main bolts and their nuts.

It is to be understood that the present invention is not limited to the embodiment described above, but encompasses any and all embodiments within the scope of the following claims.

I claim:

1. A bearing press assembled to remove a bearing from a bearing seat comprising:
   a rear plate comprising two halves assembled by two tie members;
   a front plate;
   drive means extending between and connecting said rear plate and said front plate;
   wherein said front plate and said rear plate are adapted for assembly upon an intervening shaft at opposing sides of the bearing to be removed; and
   wherein said drive means are adapted to push said rear plate and the bearing toward said front plate.

2. The bearing press of claim 1, wherein said rear plate halves are provided with apertures.

3. The bearing press of claim 2, wherein said drive means are mounted through said apertures.

4. The bearing press of claim 1, wherein said tie members are provided with apertures, with said drive means mounted therethrough.

5. The bearing press of claim 1, wherein said front plate is provided with apertures, and said drive means and an intervening shaft are positioned therethrough.

6. The bearing press of claim 1, wherein said drive means comprises at least one threaded bolt with nuts at each end.

7. The bearing press of claim 1, wherein said drive means comprises a threaded bolt with a head upon one end and a driven nut at an opposed end.

8. The bearing press of claim 1, wherein said drive means comprises two threaded bolt with a nut at each of two ends for each bolt.

9. A bearing press assembled to remove a bearing comprising:
   a rear plate assembled about an intervening shaft;
   a bearing presser between said rear plate and abutting the bearing to be removed;
   a front plate braced away from the bearing to be removed and with apertures which accept bolts and the intervening shaft;
   a bearing receiver which braces said front plate from the bearing to be removed and which provides a void for the bearing to be moved into after removal from a bearing seat; and drive means to drive said rear plate and said bearing presser and the bearing toward said front plate.

10. The bearing press of claim 8, wherein said rear plate comprises two halves assembled by two tie members and bolts with said halves, and said tie members are provided with apertures which accept the drive means and the intervening shaft.

11. The bearing press of claim 8, wherein said bearing presser comprises a pair of half cylinders that are of smaller diameter than the bearing seat, thereby allowing removal of the half cylinders after removal of the bearing and disassembly of the bearing press.

12. The bearing press of claim 8, wherein said bearing receiver is formed of two members that form a cylindrical inner opening with a diameter that is larger than the outermost dimensions of the bearing being removed.

13. The bearing press of claim 8, wherein said drive means comprise at least one threaded bolt with nuts upon each end.

14. The bearing press of claim 8, wherein said drive means comprise two threaded bolts with a nut at each end of each bolt.

* * * * *